(12) United States Patent
Rantanen et al.

(10) Patent No.: US 10,572,162 B2
(45) Date of Patent: Feb. 25, 2020

(54) STORING APPLICATION INFORMATION ON AN AUTOMATION DEVICE

(71) Applicant: ABB Technology Oy, Helsinki (FI)

(72) Inventors: Jussi Rantanen, Vantaa (FI); Vesa Metso, Helsinki (FI)

(73) Assignee: ABE Schweiz AG, Baden (CH)

( * ) Notice: Subject to any disclaimer, the term of this patent is extended or adjusted under 35 U.S.C. 154(b) by 0 days.

(21) Appl. No.: 15/434,822

(22) Filed: Feb. 16, 2017

(65) Prior Publication Data
US 2017/0242601 A1 Aug. 24, 2017

(30) Foreign Application Priority Data
Feb. 18, 2016 (EP) ..................................... 16156232

(51) Int. Cl.
G06F 3/06 (2006.01)
G06F 9/445 (2018.01)
(Continued)

(52) U.S. Cl.
CPC ....... G06F 3/0619 (2013.01); G05B 19/0426 (2013.01); G06F 3/065 (2013.01);
(Continued)

(58) Field of Classification Search
USPC ................................................ 711/154, 103
See application file for complete search history.

(56) References Cited

U.S. PATENT DOCUMENTS 6,330,502 B1 * 12/2001 Cetinkunt ............... E02F 3/435
37/414

2011/0126082 A1 * 5/2011 Pickel ................ G06F 11/0739
714/768
(Continued)

FOREIGN PATENT DOCUMENTS

| CN | 202011020 U | 10/2011 |
|----|-------------|---------|
| CN | 103429477 A | 12/2013 |
| EP | 2874033 A2 | 5/2015 |

OTHER PUBLICATIONS

European Search Report, EP16156232, ABB Technology Oy, dated Jul. 20, 2016, 5 pages.
(Continued)

*Primary Examiner* — Charles Rones
*Assistant Examiner* — Jonah C Krieger
(74) *Attorney, Agent, or Firm* — Taft Stettinius & Hollister LLP; J. Bruce Schelkopf

(57) ABSTRACT

A computerized method is disclosed in which an automation device stores, in a parameter storage, application-related parameters, each parameter uniquely identifying a specific automation device application. The automation device also stores, in an application repository, automation device applications as separate computer program entities. The automation device may detect a pre-determined act, performed by a user, the predetermined act comprising the user selecting via a user interface an application-related parameter among the application-related parameters stored in the parameter storage. Based on the detecting, the automation device retrieves, from the application repository to an execution memory, the automation device application corresponding to the selected application-related parameter, wherein the retrieved automation device application is executable from the execution memory, in order to drive the automation device for an application-related purpose.

18 Claims, 3 Drawing Sheets

(51) Int. Cl.
*G06F 9/44* (2018.01)
*G05B 19/042* (2006.01)

(52) U.S. Cl.
CPC ............ *G06F 3/067* (2013.01); *G06F 3/0679* (2013.01); *G06F 9/44* (2013.01); *G06F 9/445* (2013.01); *G06F 9/44505* (2013.01); *G05B 2219/23336* (2013.01); *G05B 2219/23427* (2013.01)

(56) References Cited

U.S. PATENT DOCUMENTS

| | | | | |
|---|---|---|---|---|
| 2012/0239170 | A1* | 9/2012 | Kulathu | G05B 19/0426 700/83 |
| 2013/0018485 | A1* | 1/2013 | Stoddard | B25J 9/1669 700/14 |
| 2013/0024542 | A1* | 1/2013 | Keller | G05B 19/0428 709/217 |
| 2014/0058537 | A1* | 2/2014 | Jost | G05B 19/0426 700/16 |
| 2014/0258480 | A1 | 9/2014 | Sharad | |
| 2014/0351492 | A1* | 11/2014 | Chen | G06F 12/0638 711/103 |

OTHER PUBLICATIONS

English Translation of 1st Chinese Office Action dated Oct. 29, 2018; Application No. 201710080780.9; Applicant: ABB Technology Oy; 14 pgs. (including translation).

English Translation of Chinese Search Report dated Oct. 18, 2018; Application No. 201710080780.9; Applicant: ABB Technology Oy; 4 pgs. (including translation).

* cited by examiner

STORING APPLICATION INFORMATION ON AN AUTOMATION DEVICE

TECHNICAL FIELD

The invention relates to a computerized storage method for an automation device.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

Frequency converters are used to change the frequency and magnitude of electricity supplied to a load. Frequency converters are being used, for example, in alternating current (AC) motor drives. In exemplary operation, a frequency converter receives AC current from an electrical power supply and converts the frequency of the received AC current to another frequency, after which the AC current is supplied to an AC electric motor. Also further parameters, for example, a voltage level of the received AC current may be changed. The AC motors are used in various applications including, for example, fans and pumps. In many applications, the use of frequency converters may provide significant energy savings compared to supplying electrical power having a constant frequency.

Programmable logic controllers (PLC) are digital computers used for automation of industrial electromechanical processes, such as control of machinery on factory assembly lines. The program for controlling the machine operation may be stored in PLC in a battery-backed-up RAM or some other non-volatile memory. However, PLC is only able to store one program at a time. Implementing PLC together with a human-machine-interface (HMI) in a frequency converter is also costly.

BRIEF DESCRIPTION

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide an enhanced method, system, apparatus and a computer program product for storing application information on a frequency converter.

BRIEF DESCRIPTION OF DRAWINGS

In the following the invention will be described in greater detail by means of preferred embodiments with reference to the attached drawings, in which.

DETAILED DESCRIPTION OF THE INVENTION

Figure 1:
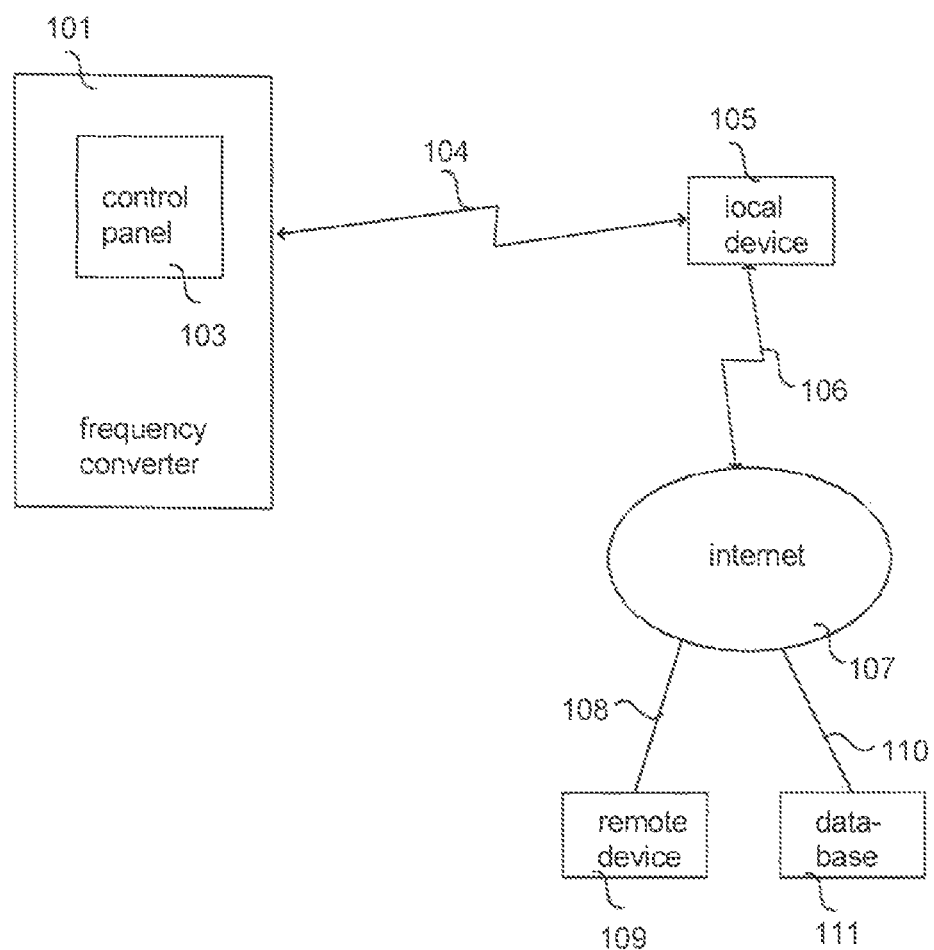
FIG. 1 illustrates a wireless communication system to which embodiments of the invention may be applied.

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Automation devices such as frequency converters may have two types of application configurations: application macros which are pre-defined parameter setups for different connection purposes, and user-sets which are user-defined parameter setups for different purposes. For example, an application macro may be a standard application macro or a 3-wire application macro. In the standard application macro, the frequency converter is configured to be used with a certain style of wiring through an input/output system (I/O). The 3-wire application macro, on the other hand, involves a possibility to control the frequency converter by means of momentary push buttons. The user-sets may, for example, relate to a situation where a customer is driving two different motors with two different control setups. Most of the frequency converters have built-in programmability. With built-in programs where a programming interface is parameter based, it is possible to utilize the user-sets for storing multiple applications to a frequency converter memory. The parameter interface limits program capabilities. Therefore, for more advanced applications SPC or CodeSys are used, wherein a run-time code of the application is stored in the frequency converter memory and run in an application sandbox or engine.

An embodiment discloses providing a single frequency converter with multiple high performance applications that may be switched on or off (depending on the installation) within a single frequency converter configuration.

An embodiment provides an application repository stored in the frequency converter memory. Each application in the application repository is introduced to the frequency converter non-volatile memory, and the applications may be started as separate program entities from the application repository. This may require more flash memory in the frequency converter, but decrease CPU performance requirements, since CPU needs to be dimensioned based on maximum application needs for one application, instead of a program where you have all the applications inside one program entity.

In an embodiment, the application repository is maintained in a non-volatile memory in the frequency converter. The non-volatile memory may be a flash memory which refers to an electronic non-volatile computer storage medium that may be electrically erased and reprogrammed. Flash memory may be used in memory cards, USB flash drives, solid-state drives, and similar products, for general storage and transfer of data, or to store configuration data in digital products. In addition to being non-volatile, flash memory offers fast read access times. The customer may select the application from the application repository e.g. during a start-up of the frequency converter. The selected application is then loaded from the flash memory to an execution memory (e.g. random access memory RAM) of the frequency converter.

For example, depending on the assembly where the frequency converter is connected to, the application may be selected by means of a parameter interface in maintenance situations (e.g. an engineer running a diagnostics application during a maintenance break), or the application may be selected by means of a fieldbus interface e.g. based on the end product of the process.

In an embodiment, the user interface of the frequency converter firmware may include a parameter for selecting the desired application from the application repository.

For example, if the frequency converter is configured to control the frequency of a crane motor, the application to be selected from the application repository during the installation of the crane is different from the application to be selected from the application repository during normal operation of the crane. The application may be selected by the user by entering/selecting the respective application-related parameter.

FIG. 1 illustrates a wireless communication scenario to which embodiments of the invention may be applied. Referring to FIG. 1, an example of a radio system to which embodiments of the invention may be applied, is based on LTE network elements. However, an embodiment is not limited to the LTE radio communications systems but may also be implemented in other radio communications systems, such as 3G, 4G, 5G, LTE-A, UMTS (universal mobile telecommunications system), EDGE, WCDMA, Bluetooth network, WiFi, WLAN or any other mobile or wireless network. In an embodiment, the presented solution may be applied between user equipment belonging to different but compatible systems such as LTE and UMTS.

A general architecture of a communication system is illustrated in FIG. 1. FIG. 1 illustrates a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for wireless communication are irrelevant to the actual invention. Therefore, they need not be discussed in more detail here.

FIG. 1 illustrates a communication system according to an embodiment. FIG. 1 illustrates an exemplary communications system in which a user terminal 105 is able to connect to the internet 107 and to one or more industrial automation devices such as a frequency converter 101 or PLC. The user terminal 105 may be a local terminal device (local device) located on-site at a close proximity of the frequency converter 101. The local terminal device 105 may comprise a user equipment such as a smartphone, mobile phone, tablet computer or laptop computer. A connection 106 of the local terminal device 105 to the internet 107 may be provided by a cellular, wireless or wired link. A connection 104 of the local terminal device 105 to the frequency converter 101 may be provided e.g. by a Bluetooth, Bluetooth low energy, WiFi, wireless mesh network, NFC (near field communication), and/or inductive connection (such as an inductive connection according to an inductive power standard (Qi) by the Wireless Power Consortium).

A network apparatus 109 may be a remote device such as a remote terminal device, server and/or database located at a service center, for facilitating service and maintenance of the frequency converter 101. The remote device 109 may facilitate different ways of how to communicate with the frequency converter 101 via the local terminal device 105. The remote device 109 may comprise e.g. a desktop computer, laptop computer, tablet computer, smartphone, mobile phone, server, database, etc. For example, a cloud service (cloud computing) may be used via the internet 107 to store frequency converter data into the service center database 111. The local and remote devices may be capable of communicating with each other via the internet 107 by utilizing the cloud service.

Figure 2:
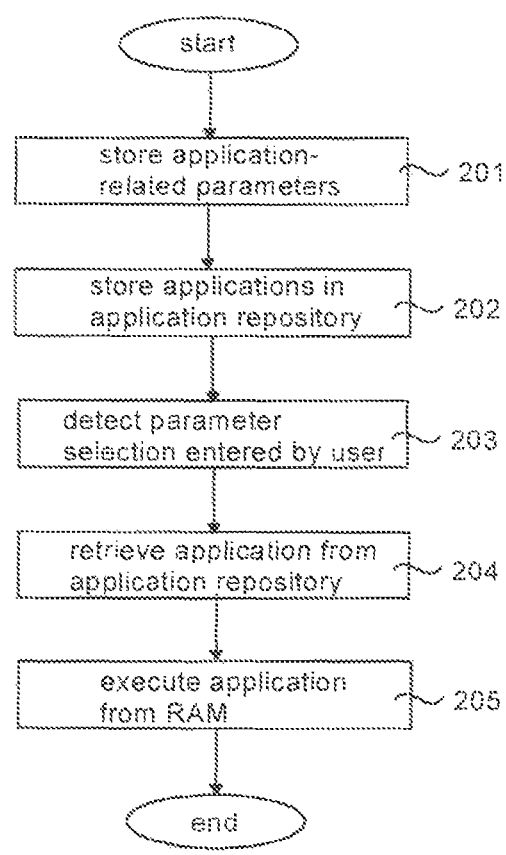
FIG. 2 illustrates a process for storing application information on a frequency converter according to an embodiment of the invention.

Let us now describe embodiments of the invention with reference to FIG. 2. FIG. 2 illustrates a computerized process for storing application information on a frequency converter, such as the frequency converter 101. Referring to FIG. 2, the frequency converter 101 is configured to store (item 201), in a parameter storage, application-related parameters, wherein each parameter uniquely identifies a specific frequency converter application. The frequency converter 101 is further configured to store (item 202), in an application repository, frequency converter applications as separate computer program entities. The frequency converter 101 is configured to detect, in item 203, a predetermined act performed by a user, the predetermined act comprising the user selecting via a user interface an application-related parameter among the application-related parameters stored in the parameter storage. Based on the detecting 203, the frequency converter 101 is configured to retrieve, from the application repository to an execution memory, the frequency converter application that corresponds to the selected application-related parameter. The retrieved frequency converter application may then be executed from the execution memory, in order to drive the frequency converter for the application-related purpose.

In an embodiment, the selection of the application from the application repository may be carried out locally by using the user interface 103 in the frequency converter 101. Alternatively, the selection of the application from the application repository may be carried out locally or remotely via a communications link 104, by using a user interface in a local communications device 105 (or remote communications device 109), such as a mobile or wireless terminal device 105, connected to the frequency converter 101 via the communications link 104.

In an embodiment, the application repository and/or the parameter storage is comprised in a non-volatile memory of the frequency converter, such as a flash memory of the frequency converter.

In an embodiment, the execution memory comprises a volatile memory of the frequency converter, such as a random access memory of the frequency converter.

In an embodiment, the application-related parameter is selected during start-up and/or maintenance of the frequency converter. The application-related parameter may also be selected during changing an implementation mode of the frequency converter (e.g. when switching from crane installation mode to normal crane operation mode).

In an embodiment, the application may be erased from the execution memory. The erasing of the application from the execution memory may be carried out automatically in response to terminating the application and/or in response to shutting down the frequency converter. Alternatively the erasing of the application from the execution memory may be carried out automatically in response to retrieving/loading a different application from the application repository to the execution memory.

Thus an embodiment discloses an application repository for frequency converters, and its use. An embodiment enables several customer-specific applications to be stored in a single frequency converter for later usage.

An embodiment enables eliminating the need for PLC. An embodiment also provides a more enhanced procedure compared to using application macros and user sets through I/O.

In an embodiment, the application repository may be updated. The updating may include adding and/or removing frequency converter applications in the application repository, and respectively adding and/or removing corresponding application-related parameters in the parameter storage.

In addition to a drive system/frequency converter, the embodiments are also applicable to other automated power conversion devices such as AC/DC modules, DC/AC modules, DC/DC modules, programmable logic controllers (PLC), switches, motion controllers, motion drives, servo motors, soft starters, robotics, cars, heavy equipment, and/or any other devices used for industrial automation.

Figure 3:
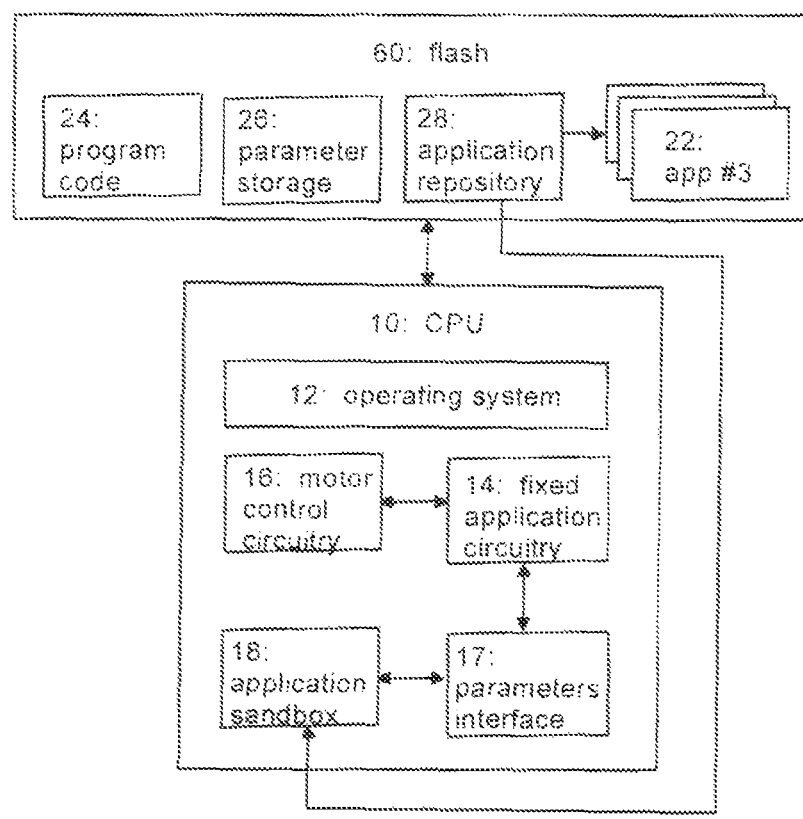
FIG. 3 illustrates an application storage arrangement according to an exemplary embodiment.

FIG. 3 illustrates exemplary frequency converter CPU blocks and an exemplary flash memory of the frequency converter 101. Referring to FIG. 3, an embodiment provides an apparatus comprising at least one central processing unit 10 and at least one memory 60 including a computer program code 24, wherein the at least one memory 60 and the computer program code 24 are configured, with the at least one processing unit 10, to cause the apparatus to carry out the procedures of the above-described frequency converter 101. FIG. 3 illustrates a block diagram of a structure of such an apparatus. The at least one processing unit 10, the at least one memory 60, and the computer program code 24 may thus be considered as an embodiment of means for executing the above-described procedures of the frequency converter 101. The apparatus may be comprised in the frequency converter, e.g. the apparatus may form a chipset or a circuitry in the frequency converter. In some embodiments, the apparatus is the frequency converter. The apparatus comprises the central processing unit CPU 10 comprising an operating system 12. The at least one memory 60 may comprise a non-volatile (flash) memory comprising a parameter storage 26 configured to store application-related parameters, each parameter uniquely identifying a specific frequency converter application. The at least one memory 60 may further comprise an application repository 28 configured to store frequency converter applications 22 as separate computer program entities. The processing unit 10 may be configured to detect a pre-determined act performed by a user, wherein the predetermined act may comprise the user selecting via a user interface (i.e. parameters interface 17) an application-related parameter among the application-related parameters stored in the parameter storage 26. In response to the detecting, the processing unit 10 is configured to retrieve, from the application repository 28 to an execution memory (i.e. application sandbox 18), the frequency converter application corresponding to the selected application-related parameter. The retrieved frequency converter application is then executable by the processing unit 10 from the execution memory 18, in order to drive the frequency converter for an application-related purpose. For example, the processing circuitry 10 may comprise a firmware (i.e. fixed application circuitry 14) which is a low-level control program, for controlling a motor control circuitry 16 based on the executable application and/or user commands obtained via the user interface 17.

In the example of FIG. 3, there are three applications 22 in the application repository 28, however, an exemplary embodiment is not limited to any particular number of applications. The parameter storage 26 may contain the application macros and the user-sets (not shown in FIG. 3).

The processing circuitry 10 may comprise the circuitries as subcircuitries, or they may be considered as computer program modules executed by the same physical processing circuitry. The memory 60 may store one or more computer program products comprising program instructions (program code 24) that specify the operation of the circuitries. The memory 60 may further store a database comprising frequency converter data, for example. The apparatus may further comprise an interface providing the apparatus with communication capability with network nodes.

As used herein, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used herein, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 1 to 3 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

The invention claimed is:

1. A computerized method comprising performing in an automation device, which comprises at least one non-volatile memory, the following:
    storing, in a parameter storage in the at least one non-volatile memory, application-related parameters, each parameter uniquely identifying a specific automation device application;
    storing, in an application repository in the at least one non-volatile memory, automation device applications as separate computer program entities, each being identified by a corresponding parameter and being executable when downloaded to a volatile execution memory in the automation device;
    detecting a user input via a user interface, the user input causing selecting one of the application-related parameters stored in the parameter storage;
    based on the detecting the selection of one application-related parameter, downloading, from the application repository to a volatile execution memory, an automation device application, which is identified by a parameter corresponding to the selected application-related parameter; and
    executing, after downloading to the volatile execution memory, the automation device application from the volatile execution memory, in order to drive the automation device according to a specific purpose of the automation device application;
    wherein the user input relates to starting up and/or maintenance of the automation device causing the application-related parameter to be selected during start-up and/or maintenance of the automation device.

2. A method according to claim 1, wherein at least one of the application repository and the parameter storage is comprised in a flash memory of the automation device.

3. A method according to claim 1, wherein the execution memory comprises a random access memory of the automation device.

4. A method according to claim 1, wherein the user input relates to switching an implementation mode of the automation device causing the application-related parameter to be selected while switching the implementation mode of the automation device.

5. A method according to claim 1, wherein the automation device is one of a frequency converter, drive system, programmable logic controller, AC/DC module, DC/AC module, DC/DC module, switch, motion controller, motion drive, servo motor, soft starter, robotic, car, and heavy equipment.

6. An automation device comprising
    at least one processor; and
    at least one non-volatile memory including a computer program code, wherein the at least one memory and the computer program code are configured, with the at least one processor, to cause the automation device to
        store, in a parameter storage in the at least one non-volatile memory in the automation device, application-related parameters, each parameter uniquely identifying a specific automation device application;
        store, in an application repository in the at least one non-volatile memory in the automation device, automation device applications as separate computer program entities, each being identified by a corresponding parameter and being executable when downloaded to a volatile execution memory in the automation device;
        select, in response to detecting via a user interface a user input relating to start-up and/or maintenance of the automation device, one of the application-related parameters stored in the parameter storage during the start-up and/or maintenance of the automation device;
        download from the application repository to the volatile execution memory, an automation device application, which is identified by a parameter corresponding to the selected one application-related parameter; and
        execute the downloaded automation device application from the execution memory, the execution causing the automation device to be driven according to a specific purpose of the automation device application.

7. An automation device of claim 6, wherein at least one of the application repository and the parameter storage is comprised in a flash memory of the automation device.

8. An automation device of claim 6, wherein the execution memory comprises a random access memory of the automation device.

9. An automation device of claim 6, wherein the at least one memory and the computer program code are configured, with the at least one processor, to cause the automation device to select the application-related parameter during switching an implementation mode of the automation device.

10. An automation device of claim 6, wherein the automation device is for an industrial site and one of a frequency converter, drive system, programmable logic controller, AC/DC module, DC/AC module, DC/DC module, switch, motion controller, motion drive, servo motor, soft starter, robotic, car, and heavy equipment.

11. A drive system comprising the automation device of claim 6.

12. A computer program product embodied on a non-transitory distribution medium readable by a computer and comprising program instructions which, when loaded into an apparatus, execute the method according to claim 1.

13. A method of claim 1, further comprising:
    erasing the automation device application from the volatile execution memory after the automation device application has been terminated.

14. An automation device of claim 6, wherein the volatile execution memory is configured to contain one automation device application at a time.

15. A computerized method comprising performing in an automation device, which comprises at least one non-volatile memory, the following:
    storing, in a parameter storage in the at least one non-volatile memory, application-related parameters, each parameter uniquely identifying a specific automation device application;
    storing, in an application repository in the at least one non-volatile memory, automation device applications as separate computer program entities, each being identified by a corresponding parameter and being executable when downloaded to a volatile execution memory in the automation device;

detecting a user input via a user interface, the user input relating to switching an implementation mode of the automation device and causing selecting one of the application-related parameters stored in the parameter storage while switching the implementation mode of the automation device;

based on the detecting the selection of one application-related parameter, downloading, from the application repository to a volatile execution memory, an automation device application, which is identified by a parameter corresponding to the selected application-related parameter; and executing, after downloading to the volatile execution memory, the automation device application from the volatile execution memory, in order to drive the automation device according to a specific purpose of the automation device application.

16. An automation device comprising
at least one processor; and
at least one non-volatile memory including a computer program code, wherein the at least one memory and the computer program code are configured, with the at least one processor, to cause the automation device to store, in a parameter storage in the at least one non-volatile memory in the automation device, application-related parameters, each parameter uniquely identifying a specific automation device application;

store, in an application repository in the at least one non-volatile memory in the automation device, automation device applications as separate computer program entities, each being identified by a corresponding parameter and being executable when downloaded to a volatile execution memory in the automation device;

select, in response to detecting via a user interface a user input relating to switching an implementation mode of the automation device, one of the application-related parameters stored in the parameter storage during switching the implementation mode of the automation device;

download, from the application repository to the volatile execution memory, an automation device application, which is identified by a parameter corresponding to the selected one application-related parameter; and execute the downloaded automation device application from the execution memory, the execution causing the automation device to be driven according to a specific purpose of the automation device application.

17. A drive system comprising the automation device of claim 16.

18. A computer program product embodied on a non-transitory distribution medium readable by a computer and comprising program instructions which, when loaded into the computer, execute a computer process comprising causing an apparatus to perform the method steps of claim 15.

\* \* \* \* \*